(12) United States Patent
Kolb et al.

(10) Patent No.: US 10,982,910 B2
(45) Date of Patent: Apr. 20, 2021

(54) HEAT EXCHANGER AND METHOD FOR USE THEREOF

(71) Applicant: Fraunhofer-Gesellschaft Zur Förderung Der Angewandten Forschung E.V., Munich (DE)

(72) Inventors: Gunther Kolb, Neustadt (DE); Stefan Henninger, Endingen (DE); Gunther Munz, Malterdingen (DE); Harry Kummer, Freiburg (DE); Felix Jeremias, Freiburg (DE)

(73) Assignee: Fraunhofer-Gesellschaft Zur Forderung Der Angewandten Forschung E.V., Munich (DE)

( * ) Notice: Subject to any disclaimer, the term of this patent is extended or adjusted under 35 U.S.C. 154(b) by 411 days.

(21) Appl. No.: 16/060,668

(22) PCT Filed: Dec. 8, 2016

(86) PCT No.: PCT/EP2016/080233
§ 371 (c)(1),
(2) Date: Jun. 8, 2018

(87) PCT Pub. No.: WO2017/097892
PCT Pub. Date: Jun. 15, 2017

(65) Prior Publication Data
US 2018/0356165 A1 Dec. 13, 2018

(30) Foreign Application Priority Data
Dec. 9, 2015 (DE) .................. 10 2015 224 660.4

(51) Int. Cl.
| F28D 21/00 | (2006.01) |
| F28F 27/00 | (2006.01) |
| F25B 37/00 | (2006.01) |
| F25B 17/08 | (2006.01) |
| B01J 20/34 | (2006.01) |
| B01D 53/26 | (2006.01) |
(Continued)

(52) U.S. Cl.
CPC ..... *F28D 21/0014* (2013.01); *B01D 53/0407* (2013.01); *B01D 53/0454* (2013.01); *B01D 53/0462* (2013.01); *B01D 53/261* (2013.01); *B01J 20/103* (2013.01); *B01J 20/18* (2013.01); *B01J 20/20* (2013.01); *B01J 20/226* (2013.01); *B01J 20/28042* (2013.01); *B01J 20/28047* (2013.01); *B01J 20/3204* (2013.01); *B01J 20/324* (2013.01); *B01J 20/3206* (2013.01); *B01J 20/3236* (2013.01); *B01J 20/3238* (2013.01); *B01J 20/3433* (2013.01); *B01J 20/3483* (2013.01); *F25B 17/08* (2013.01); *F25B 37/00* (2013.01); *F28F 27/00* (2013.01); *B01D 2253/102* (2013.01); *B01D 2253/106* (2013.01); *B01D 2253/108* (2013.01); *B01D 2253/204* (2013.01); *B01D 2255/1021* (2013.01); *B01D 2255/1023* (2013.01); *B01D 2255/1025* (2013.01);
(Continued)

(58) Field of Classification Search
CPC . F28F 27/00; F28F 19/00; F25B 17/00; F28D 2021/0038; B01D 53/0462; B01D 53/26; B01D 2257/708; B01D 2257/80; B01D 53/0407; B01D 2253/108; B01D 2258/06; B01D 2253/204; B01D 2253/102; B01D 2253/106; B01D 53/261; B01D 2259/4508; B01J 20/324; B01J 20/20; B01J 20/3238; B01J 20/3433; B01J 20/18; B01J 20/28042; B01J 20/3236; B01J 20/3204; B01J 20/103; B01J 20/3483
See application file for complete search history.

(56) References Cited

U.S. PATENT DOCUMENTS 5,447,693 A * 9/1995 Ohta .................. A61L 9/03
  237/12.3 A
5,729,988 A * 3/1998 Tchernev .............. F28D 20/003
  62/106
(Continued)

FOREIGN PATENT DOCUMENTS

| CN | 1409069 A * | 4/2003 | ............... F24H 1/16 |
| DE | 10233762 A1 | 2/2003 | |
(Continued)

OTHER PUBLICATIONS

Kolb, Gunther et al., "Design and operation of a compact microchannel 5 kWel,net methanol steam reformer with novel Pt/In2O3 catalyst for fuel cell applications," Chem. Eng. J. 207-208, 388-402 (2012).
(Continued)

*Primary Examiner* — Timothy C Vanoy
(74) *Attorney, Agent, or Firm* — Alix, Yale & Ristas, LLP (57) ABSTRACT

The invention relates to a heat exchanger having at least one sorption duct in which is arranged a sorption medium and through which a fluid can be made to flow, characterized in that the heat exchanger also contains at least one catalyst with which a fuel can be converted exothermically such that at least some of the resulting heat can be conveyed to the sorption medium. The invention also relates to a method for heating and/or conditioning a gas stream, having at least the following steps: supplying a gas stream, containing multiple different components, into a sorption duct in which is arranged a sorption medium, such that at least one component is bound in the sorption medium, and supplying and exothermically converting at least one fuel under the action of a catalyst, such that at least one component of the gas stream is expelled from the sorption medium.

17 Claims, 4 Drawing Sheets

(51) Int. Cl.
*B01D 53/04* (2006.01)
*B01J 20/32* (2006.01)
*B01J 20/18* (2006.01)
*B01J 20/28* (2006.01)
*B01J 20/20* (2006.01)
*B01J 20/10* (2006.01)
*B01J 20/22* (2006.01)

(52) U.S. Cl.
CPC .............. *B01D 2255/20761* (2013.01); *B01D 2258/06* (2013.01); *B01D 2259/4508* (2013.01); *F25B 2315/005* (2013.01); *Y02A 30/27* (2018.01)

(56) References Cited

U.S. PATENT DOCUMENTS 7,654,312 B2 * 2/2010 Baeuerle .................. F02B 37/18
165/202

2005/0204762 A1 * 9/2005 Sasaki ..................... H01L 35/00
62/238.2
2008/0039665 A1 2/2008 Brown et al.
2010/0137657 A1 6/2010 Wegerer et al.

FOREIGN PATENT DOCUMENTS

| EP | 2135665 A1 | 12/2009 | |
|---|---|---|---|
| EP | 2253813 A1 | 11/2010 | |
| JP | 11294893 A * | 10/1999 | ............ Y02P 80/152 |
| JP | 3263547 B2 * | 3/2002 | ................ F24F 1/00 |

OTHER PUBLICATIONS

Munz, Gunther M. et al., "First results of a coated heat exchanger for the use in dehumidification and cooling processes," Applied Thermal Engineering 61, 878-883 (2013).
International Search Report dated Mar. 22, 2017 (PCT/EP2016/080233).

* cited by examiner

HEAT EXCHANGER AND METHOD FOR USE THEREOF

FIELD OF THE DISCLOSURE

The invention relates to a heat exchanger having at least one sorption duct, in which a sorbent is arranged and through which a fluid can flow. The invention also relates to a method for heating and/or for conditioning a gas stream, in which a gas stream containing a plurality of different components is introduced into a sorption duct in which a sorbent is arranged, such that at least one component is bonded in the sorbent. Devices and methods of this type can be used for dehumidification, for air-conditioning or as part of a self-contained, sorptive refrigeration machine or heat pump.

BACKGROUND

G. M. Munz et al.: "First results of a coated heat exchanger for the use in dehumidification and cooling process, Applied Thermal Engineering 61 (2013) 878-883, discloses a device of this type. It contains a cross-flow heat exchanger, some of the boundary surfaces of which are coated with a sorbent. This serves to improve the indoor climate in a building by dehumidifying the external air supplied to the room. The indoor climate can thus be improved, in particular in hot and moist climate zones, as a result of which energy for additional cooling can be saved. This known device has to be regenerated after the full loading of the sorbent. For this purpose, the heat exchanger is supplied with heat via a heat transfer fluid, which causes the stored moisture to be expelled from the sorbent.

However, this known device has the drawback that in addition to the sorbent the housing of the heat exchanger and the pipes used to supply the heat transfer medium are heated as well. The energetic efficiency is thus only low.

It is also known from practice to heat such a heat exchanger by hot air, heating water or thermal oil. In this case, the heating by heating water is limited to temperatures below 100° C. unless the system is operated with excess pressure. However, this requires a reinforced mechanical design and thus the heating of additional masses which result from the mechanically reinforced design. Although the use of thermal oil can serve to transfer heat at higher temperatures, it creates an environmental problem when disposed of or in the case of leakages.

SUMMARY

Proceeding from the prior art, the object of the invention is thus to provide a method and a device for the sorption of individual components of a gas stream, said method having an improved efficiency with respect to the prior art.

According to the invention, this object is achieved by a device according to claim 1 and a method according to claim 8. Advantageous developments of the invention are found in the subclaims.

The invention proposes a heat exchanger which has at least one sorption duct. In various embodiments of the invention, the heat exchanger can have different designs and e.g. be configured as a shell and tube heat exchanger, as a cross-flow heat exchanger or as another design known per se. It is essential that the heat exchanger has at least one sorption duct, through which the gas stream to be conditioned is passed. In some embodiments of the invention, the heat exchanger can optionally also have further fluid channels, through which the heat exchanger can be provided with hot or cold heat transfer fluids or exothermically reacting fuels.

At least one sorbent is arranged in the at least one sorption duct. The sorbent is selected in such a way that a predeterminable component of the gas stream is adsorbed when the gas stream flows in the sorption duct. In some embodiments of the invention, the gas stream can be ambient air. The sorbent can then be configured to adsorb water or contaminants from the supplied ambient air, as a result of which a dehumidified and/or contaminant-reduced air flow is available at the outlet of the heat exchanger, said air flow being usable e.g. as a feed air flow of an automatic ventilation system for a building, a vehicle or an aircraft. In other embodiments, the heat exchanger can be part of a sorption refrigeration machine or a sorption heat pump. In this case, the fluid flowing in the sorption duct is a refrigerant which contains e.g. water, alcohol and/or $CO_2$.

Regardless of whether the heat exchanger according to the invention is used for dehumidification, for air-conditioning or as part of a self-contained sorption refrigeration machine or sorption heat pump, it has to be regenerated and/or unloaded again after a loading cycle, in which at least one component was attached to the sorbent. For this purpose it is proposed according to the invention to exothermically react a liquid or gaseous fuel in the heat exchanger so as to supply at least some of the resulting heat to the sorbent. As a result, the heat required for the regeneration or desorption is directly generated in the heat exchanger so as to avoid the unnecessary heating of connection lines and heat losses due to long transport distances of the heat. Furthermore, the combustion process can proceed at ambient pressure, at a slight excess pressure or at a low negative pressure so as to avoid a reinforced mechanical design of the heat exchanger which would require the application of additional amounts of heat as a result of the additional material used.

For the exothermic reaction of the fuel, a catalyst is provided which is also arranged in the interior or at least on an outer boundary wall of the heat exchanger. In some embodiments of the invention, the catalyst can be attached in the form of microparticles or nanoparticles, at least to partial areas of the heat exchanger. In other embodiments of the invention, the catalyst can be arranged in the interior of the heat exchanger in the form of a metallic mesh, a coating or a metal plate.

The fuel reacting exothermically in the interior of the heat exchanger can be e.g. an alcohol. In some embodiments of the invention, the fuel can contain methanol. In other embodiments of the invention, the fuel can be a mixture of different hydrocarbons, e.g. purified gasoline, turpentine or kerosene. In yet other embodiments of the invention, the fuel can be gaseous and contain, or consist of, e.g. hydrocarbons, such as methane, propane, butane, acetylene or a mixture of these substances. In some embodiments of the invention, the fuel can be natural gas or contain natural gas. This results in a particularly simple integration of the heat exchanger into an existing house installation, such that the heat exchanger can be used as part of the sorption heat pump for heating the building or can be part of a dehumidification or air-conditioning device.

A liquid fuel can be supplied to the heat exchanger via an evaporator, an atomizing nozzle or an ultrasonic nebulizer. The fuel can be inserted into a gas stream, such that the oxygen required for the reaction reaches the catalyst where the exothermic reaction takes place at the same time as the fuel. The fuel/air mixture can have a stoichiometric ratio, such that the fuel is fully reacted in the heat exchanger and the waste gas stream only contains $CO_2$ and water. This serves to avoid the generation of toxic waste gases.

In some embodiments of the invention, the heat exchanger contains a main support having a first side and an opposite second side, wherein the at least one catalyst is arranged on the second side and the sorbent is arranged on the first side. The main support can be made of a sheet metal which contains, or consists of, e.g. aluminum, copper or stainless steel. The sheet metal can have a thickness of about 0.1 mm to about 0.5 mm. Since the heat exchanger according to the invention operates with only a slight excess pressure which merely results from the stagnation pressure of the sorption duct and the possibly additional fluid channels, low wall thicknesses suffice to guarantee the mechanical stability of the heat exchanger. These low wall thicknesses only have a low thermal resistance, and therefore the heat generated on the second side of the main support can influence the sorbent on the first side in a rapid and low-loss way. This embodiment of the invention has the advantage that the fuel or the combustion products thereof cannot affect the sorbent so as to avoid the damage or loading thereof with undesired substances.

In some embodiments of the invention, the catalyst and the sorbent can be arranged on the same side of the main support. In this case, the heat exchanger is provided with the working fluid in a first method step and the fuel/air mixture is supplied for the purpose of regeneration in a second step. The reaction is here carried out directly on the surface of the sorbent, such that heat resistances are further reduced.

In some embodiments of the invention, the catalyst and/or the sorbent can be applied by screen printing and/or with a doctor blade and/or by sputtering and/or by wash-coating of the main support. A wash-coat can be applied by immersion, spin-coating or by flooding. This allows a cost-effective and rapid production of the heat exchanger or of the parts thereof.

In some embodiments of the invention, the second side of the main support and a housing part can confine a fluid channel. The fluid channel can be designed for dissipating heat released during the adsorption from the heat exchanger and/or supplying a fuel/air mixture which subsequently reacts exothermically on the surface of the catalyst and thus expels adsorbates out of the sorbent.

In some embodiments of the invention, the heat exchanger can also contain at least one lambda probe and/or at least one temperature sensor. The thus detected measured values can be supplied to a control device which controls or feedback-controls the amount of the supplied fuel/air mixture and/or the fuel part in the fuel/air mixture to thus control the amount of heat released in the heat exchanger. As a result, the desorption process can proceed in such a way that the sorbent is not damaged. Furthermore, it is possible by the detection of the temperature increase to determine the point in time at which the sorbent is fully unloaded and the supply of the fuel/air mixture should be stopped.

In some embodiments of the invention, the sorbent can contain, or consist of, at least one metal organic framework and/or activated carbon and/or at least one zeolite and/or at least one silica gel. In other embodiments, the sorbent can be zeolite-like and contain e.g. silica-aluminophosphate, aluminophosphate. In yet another embodiment, the sorbent can contain covalent organic frameworks or periodic mesoporous materials. These sorbents allow the use of the heat exchanger for dehumidification, for absorbing odors or contaminants or as part of a sorption heat pump or a sorption refrigeration machine.

In some embodiments of the invention, the catalyst of the heat exchanger contains platinum and/or palladium and/or rhodium and/or indium and/or copper and/or at least one oxide of said metals. For example, alcohols or hydrocarbons can be reacted exothermically without an open flame at such a catalyst. As a result, there is no danger of explosion when this heat exchanger is operated.

In some embodiments of the invention, the fuel can be reacted exothermically at about 40° C. up to about 850° C. The temperature can be matched with the employed sorbent so as to avoid an undesired damage of the heat exchanger. In some embodiments of the invention, the fuel can be reacted exothermically at a temperature of about 60° C. up to about 200° C. In yet another embodiment of the invention, the fuel can be reacted at about 45° C. to about 130° C. These temperatures suffice to expel e.g. water from a sorbent.

In some embodiments of the invention, the sorbent and/or the catalyst can be preheated by an electric heater and/or by sorption of a component of the gas stream in the sorbent before the fuel is introduced. As a result, the reaction of the fuel/air mixture starts directly after it was introduced into the associated fluid channel and was brought into contact with the catalyst. If the heat generating in the sorption of a component of the gas stream in the sorbent is used to preheat the catalyst to the operating temperature, no additional electrical auxiliary energy is required to regenerate the heat exchanger.

BRIEF DESCRIPTION OF THE DRAWINGS

The invention shall be explained in more detail below by means of drawings without limiting the general inventive concept, wherein.

DETAILED DESCRIPTION

Figure 1:
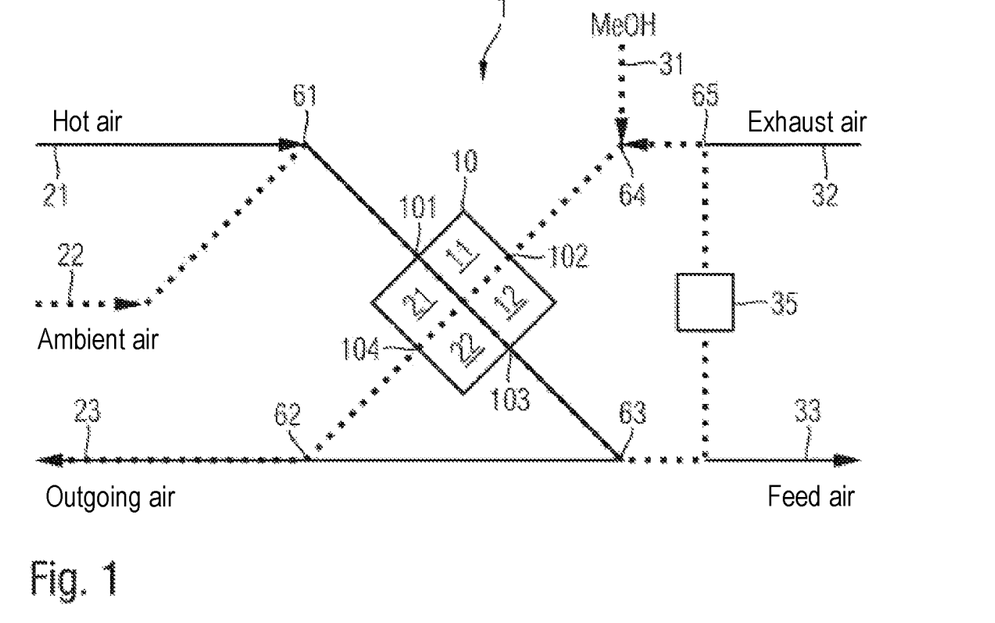
FIG. 1 shows an embodiment of the invention when used in a dehumidification or air-conditioning system.

FIG. 1 explains an application example of the heat exchanger according to the invention. It is an open sorptive dehumidification and air-conditioning system 1. This system contains a first suction opening 21 and a second suction opening 22 for ambient air. Here, external air can be supplied to the second suction opening 22, and hot air from a solar thermal system can be supplied to the first suction opening 21. Furthermore, the device has a first exhaust air opening 23, through which air from the interior of the building and exhaust gases can be dissipated into the open.

Furthermore, the device communicates with an interior to be ventilated via an outwards ventilation 32 and an inwards ventilation 33. The inwards ventilation 33 serves to supply heated and/or cooled and/or dehumidified air to the interior of a building, a vehicle or an aircraft. Air from the interior can be dissipated via the outwards ventilation 32.

Finally, the device has a fuel supply 31 for a liquid or gaseous fuel. In the illustrated embodiment, methanol is used as the fuel to heat the heat exchanger 10 and thus regenerate the sorbent.

The heat exchanger 10 of the device 1 is designed as a cross-flow heat exchanger, i.e. a first fluid flow can be supplied to the heat exchanger via the inlet 101 and can be dissipated via the outlet 103. A second fluid flow can be supplied via the second inlet 102 and can be dissipated via the second outlet 104. The cross-flow heat exchanger 10 allows a heat transfer from the first fluid flow to the second fluid flow. However, a mass transfer is prevented by corresponding walls. The first inlet 101 opens into a sorption duct in which the supplied fluid can be brought into contact with a sorbent.

Furthermore, the device 1 has valves 61, 62, 63, 64 and 65, which operate automatically or mechanically. By switching these valves it is possible to realize different operating states.

In an exemplary first operating state, external air can be supplied via the second suction opening 22 and is dehumidified in the heat exchanger 10 and then supplied to the interior via the inwards ventilation 33. For this purpose, the inlet 101 of the heat exchanger 10 is connected to the second suction opening 22 via the valve 61, and the outlet 103 of the heat exchanger 10 is connected to the inwards ventilation 33 by means of the valve 63. Along with a dehumidification, the external air can also be freed, alternatively or additionally, from contaminants and odors, e.g. when the sorbent contains, or consists of, activated carbon. This application can be advantageously used for treating the bleed air of an aircraft engine that is intended for heating in order to free this air from hydrocarbons and lubricant residues.

If, at the same time, the valves 65, 65 and 62 are switched correspondingly, a second volume flow can be passed from the outwards ventilation 32 via the valves 65 and 64 to the second inlet 102 of the heat exchanger 10 and further from the outlet 104 via the valve 62 to the exhaust air opening 23. If water is supplied at the fuel supply 31 and subsequently evaporates, the air flow supplied from outside can additionally be cooled.

In an exemplary second operating state, hot air from a solar system can be supplied via the first suction opening 21 and dissipated via the exhaust air opening 23 for the regeneration of the sorbent. For this purpose, the hot air flow is passed to the inlet 101 of the heat exchanger 10 via the valve 61. The hot air loaded with the adsorbate leaves the heat exchanger 10 via the outlet 103 and is dissipated via the valves 63 and 62 without penetrating the room to be ventilated.

In an exemplary third operating state, the exhaust air dissipated from the room can be mixed with a liquid or gaseous fuel which is supplied via the fuel supply 31. This allows the regeneration of the sorbent when no sufficient heat amount from the solar system is available.

For this purpose, ambient air is supplied to the first inlet 101 of the heat exchanger 10 via the second suction opening 22 to discharge the adsorbate. This air leaves the heat exchanger via the outlet 103 and is passed to the valve 63 from where it travels to the exhaust air opening 23. A second gas flow can be supplied by the outwards ventilation 32 via the second inlet 102. A fuel is supplied to this gas flow. In the illustrated embodiment, e.g. methanol can be used for this purpose. The methanol is exothermically reacted at the catalyst in the heat exchanger 10. The products of this reaction leave the heat exchanger via the outlet 104 and are passed to the exhaust air opening 23 via the valve 62. Due to the heating of the sorbent, attached adsorbates are expelled and dissipated with the first gas stream via the outlet 103.

The second gas stream can optionally also be removed via the valve 63 and be supplied to the heat exchanger via the valves 65 and 64, such that the air used for the reaction of the fuel does not come from the room to be air-conditioned.

In order to start the catalytic reaction, the second gas stream can be preheated by means of the optional heater 35. For this purpose, the electric heater 35 can be configured to heat the exhaust air flow 32 dissipated from the room and the fuel/air mixture to a temperature above 40° C., above 50° C. or above 60° C. to start the reaction at the catalyst in the heat exchanger 10. For this purpose, the electric heater can have a power of about 100 W to about 1000 W or between about 200 W and about 600 W or between about 400 W and about 550 W. In some embodiments, the operating time of the electric heater 35 can be between about 1 minute and about 5 minutes.

In an exemplary fourth operating state, the desorption can be supported by means of catalytic reaction of a fuel according to the third operating state using a simultaneous hot air supply according to the second operating state.

In an exemplary fifth operating state, the hot air removed from the solar system can also be used at the first suction opening 21 for heating the room air via the inwards ventilation 33 to thus save heating energy.

Figure 2:
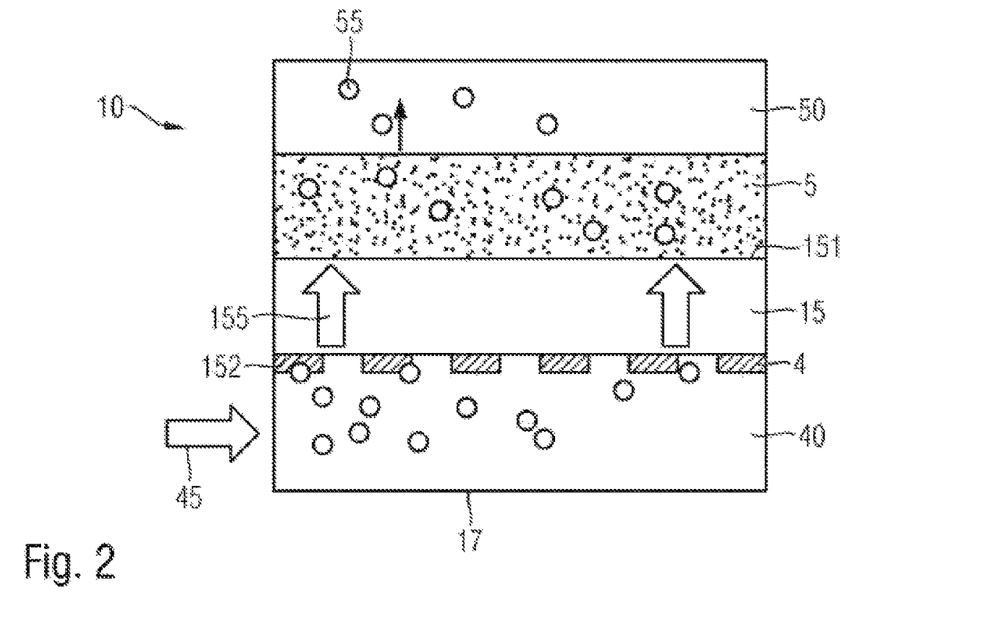
FIG. 2 shows a section from a heat exchanger according to the invention during desorption.
Figure 3:
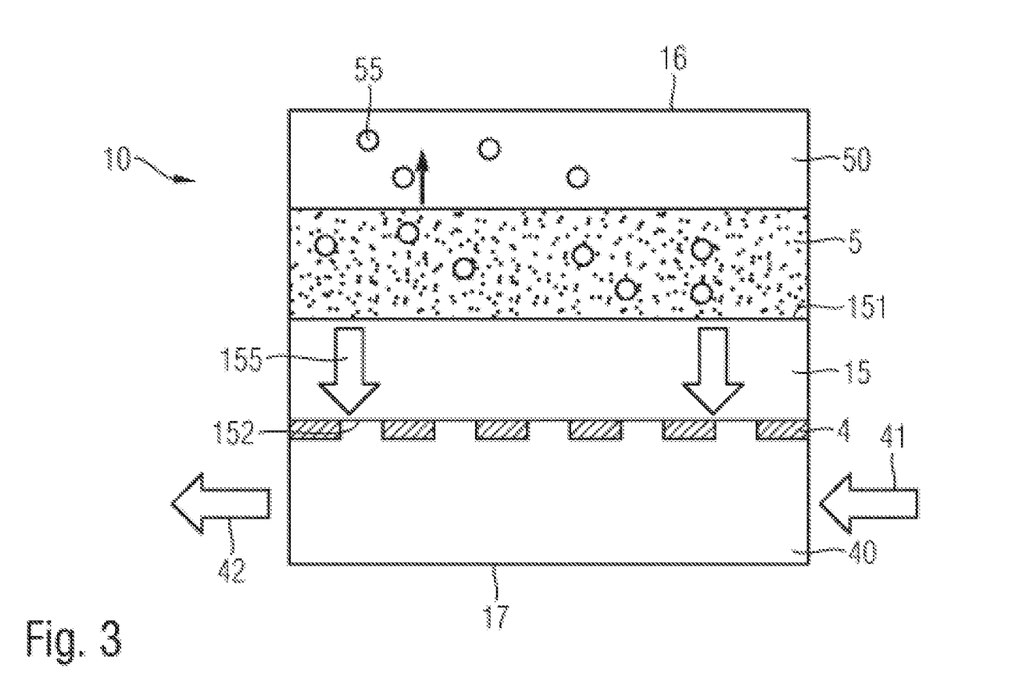
FIG. 3 shows the section from the heat exchanger according to FIG. 2 during adsorption.

FIGS. 2 and 3 show a section of the heat exchanger 10 in different operating states of adsorption and desorption. The heat exchanger 10 can be e.g. part of an open air-conditioning and dehumidifying apparatus 1 as explained by means of FIG. 1. In other embodiments of the invention, the heat exchanger 10 can be part of a sorption heat pump or a refrigeration machine.

FIG. 2 shows an operating state of the heat exchanger 10, in which adsorbates 55 are expelled from the sorbent 55.

The heat exchanger 10 has at least one main support 15. The main support 15 has a first side 151 and an opposite side 152. The main support 15 can be made from a material having good thermal conductivity, e.g. aluminum or copper. In other embodiments of the invention, the main support 15 can also consist of plastic materials which can be provided with fillers that increase the thermal conductivity.

The first side 151 of the main support 15 is provided with a sorbent 5. The sorbent 5 can be e.g. a silica gel, a zeolite or activated carbon or contain these materials.

A catalyst 4 is arranged on the second side 152 of the main support 15. The catalyst 4 can be e.g. a noble metal catalyst known per se.

Together with a housing wall 17, the second side 152 of the main support 15 confines a fluid channel 40. Together with a housing wall 16, the surface of the sorbent 5 confines, in the same way, a sorption duct 50 on the first side 151 of the main support 15.

It should be noted that the fluid channel 40 is optional and can also be omitted in other embodiments of the invention, as explained below.

In the operating state shown in FIG. 2, a fuel 45 is introduced into the fluid channel 40. The fuel 45 can be liquid or gaseous and contain e.g. an alcohol. In other embodiments of the invention, the fuel 45 can consist of a mixture of hydrocarbons having different chain lengths. In this case, the fuel 45 can be e.g. gasoline or natural gas.

The fuel 45 is reacted on the surface of the catalyst 4. This reaction is preferably carried out without an open flame to avoid a deflagration and a danger for the user of the heat exchanger 10. The heat 155 released by a so called silent combustion penetrates the main support 15 and acts on the sorbent 5. As a result, adhering adsorbates 55 are expelled from the sorbent 5. The sorbent 5 can be regenerated in this way to be loaded again with adsorbates 55 in a subsequent method step.

The reaction of the fuel 45 at the catalyst 4 can be controlled or feedback-controlled in such a way that there is a predeterminable temperature or a temperature profile and/or a temperature distribution at the sorbent 5. For example, the temperature can increase continuously from about 40° C. to about 120° C. to thus initially expel weakly bonded adsorbates 55 from the sorbent 5 and then expel more strongly bonded adsorbates from the sorbent 5. In some embodiments of the invention, it is possible to reach conclusions about the state and/or the loading degree of the sorbent 5 from the measured temperature when the heat flow 155 is known, such that the supply of the fuel 45 is terminated e.g. when a predeterminable temperature threshold has been reached.

FIG. 3 shows a following or also preceding method step. The same reference signs designate the same constituents of the invention, and therefore the below description is limited to the relevant differences.

According to FIG. 3, a fluid flow is supplied to the sorption duct 50 and contains at least two different components. For example, the fluid flow can be ambient air which is loaded with water or contaminants, such as volatile organic compounds (VOC). In other embodiments of the invention, the fluid flow can be a water/alcohol mixture. In yet other embodiments of the invention, a contaminated gas flow, e.g. an exhaust gas, can be guided in the sorption duct 50.

The sorbent 5 is configured to attach at least one predeterminable component of the gas stream as an adsorbate 55. For example, the alcohol of a water/alcohol mixture can be separated and be bonded in the sorbent 5. In other embodiments of the invention, the sorbent 5 can be saturated with water when a water-containing gas stream which shall be dehumidified flows in the sorption duct 50.

When the adsorbate 55 is adsorbed in the sorbent 5, heat is released and penetrates the main support 15 as a heat flow 155. The heat can be dissipated by a fluid flow which is supplied to the fluid channel 40 as a cold fluid 41 and is dissipated as a heated fluid 42. The fluid flow 41 can be cooling water, for example. In other embodiments of the invention, the fluid flow 41 can be room air which is heated in the fluid channel 40 and is supplied again to the room as heating energy. In other embodiments of the invention, the released heat can be used as process heat for industrial production or drying processes. In this case the heated gas flow 42 can be supplied to the material to be dried and the moisture-laden gas stream can be supplied again to the sorption duct 50 after passing the material to be dried, as a result of which the heat exchanger 10 itself produces at least part of the required process heat for the drying process by adsorption of the water 55.

Figure 4:
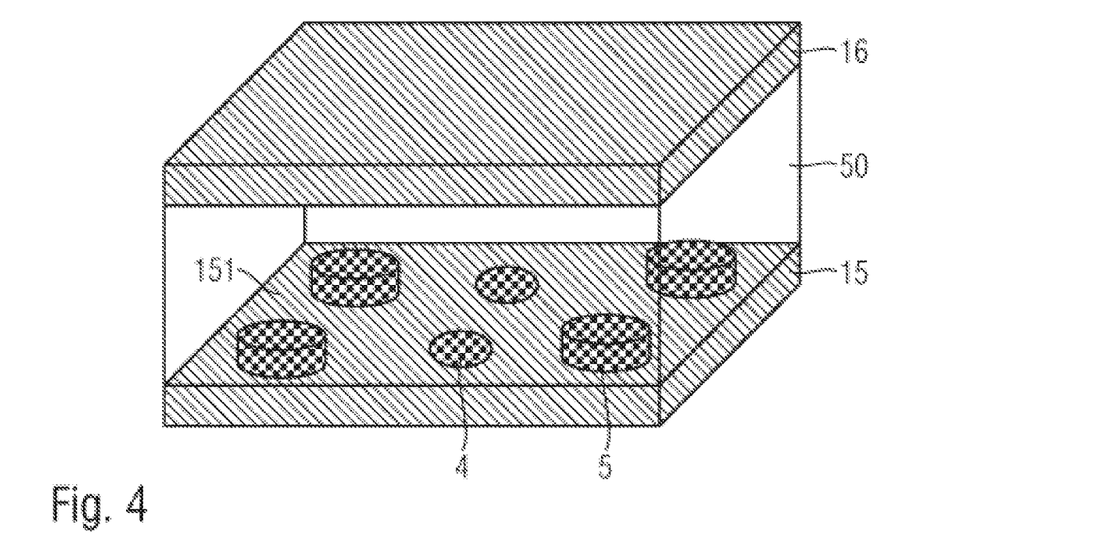
FIG. 4 shows an alternative embodiment of the heat exchanger in cross-section.
Figure 5:
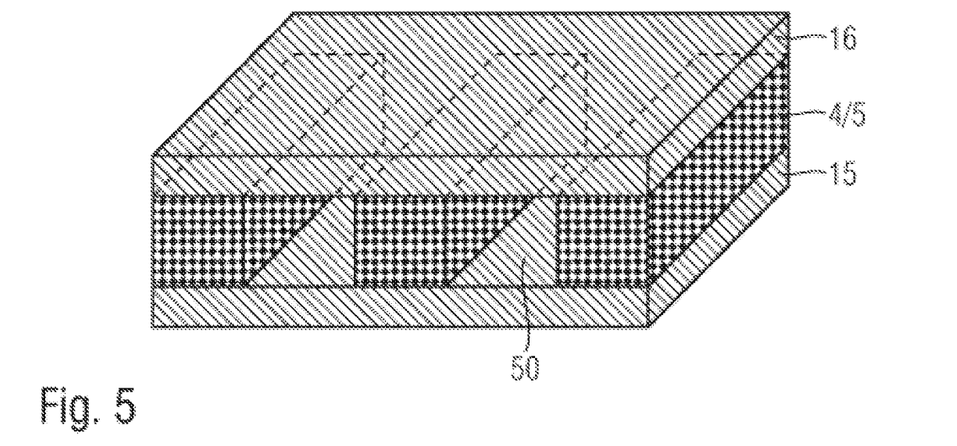
FIG. 5 shows another embodiment of the heat exchanger in cross-section.

FIGS. 4 and 5 explain further embodiments of the invention, which dispense with an additional fluid channel 40.

The embodiment according to FIG. 4 has a sorption duct 50, which is confined by a housing part 16 and a main support 15. The main support 15 has a first side 151, on which at least one sorbent 5 and at least one catalyst 4 are each supplied as a partial coating. It is thus possible to condition or dehumidify a gas stream by passing through the sorption duct 50 and, in so doing, coming in contact with the sorbent 5.

For the purpose of regeneration, a fuel/air mixture can be supplied to the sorption duct 50 and can be exothermically reacted on the surfaces of the catalyst 4. In this connection, the releasing heat can be transferred to the sorbent 5 by either the gas stream or the heat conduction in the main body 15.

The embodiment according to FIG. 5 shows a plurality of sorption ducts 50, each of which is confined by bar-shaped components which contain both the sorbent 5 and the catalyst 4. Sorbent and catalyst can be available as a partial coating, as described above. In other embodiments of the invention, the sorbent 5 can be doped with the catalyst 4.

FIGS. 6 to 10 illustrate different embodiments, all of which show the combination of the sorbent 5 and the catalyst 4 on the main support 15. The same components of the invention are here provided with the same reference signs, and therefore the below description is confined to the essential differences.

Figure 6:
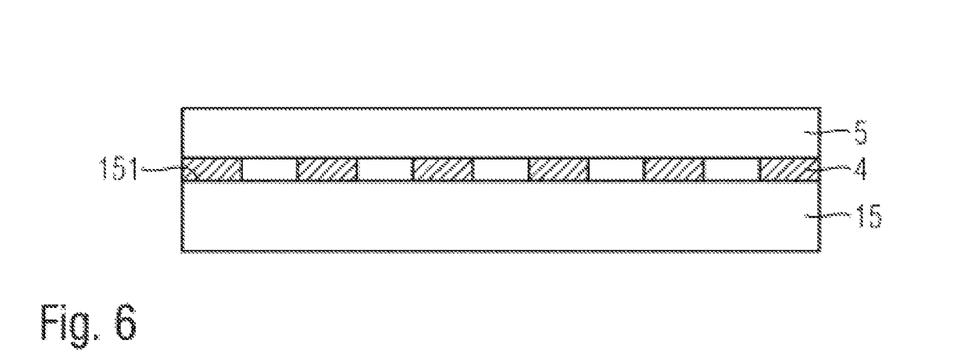
FIG. 6 shows the connection of the catalyst, the sorbent and the main support in a first embodiment.

According to FIG. 6, the catalyst is applied to the first side 151 of the main support 15 as a full or partial coating. In this case, the catalyst can be applied from the gas phase by spin coating or as a wash-coat or by PVD or CVD techniques. These methods allow the deposition of both metallic and ceramic catalysts 4 on the main support 15.

A layer of sorbent 5 can be applied to the resulting surface of the catalyst 4, e.g. by pressing or adhering. Flow channels can optionally be formed in the resulting coating of sorbent 5 and catalyst 4, via which the fuel/air mixture can be supplied.

In this way, the heat generated at the catalyst by the reaction of the fuel is directly supplied to the sorbent 5.

Figure 7:
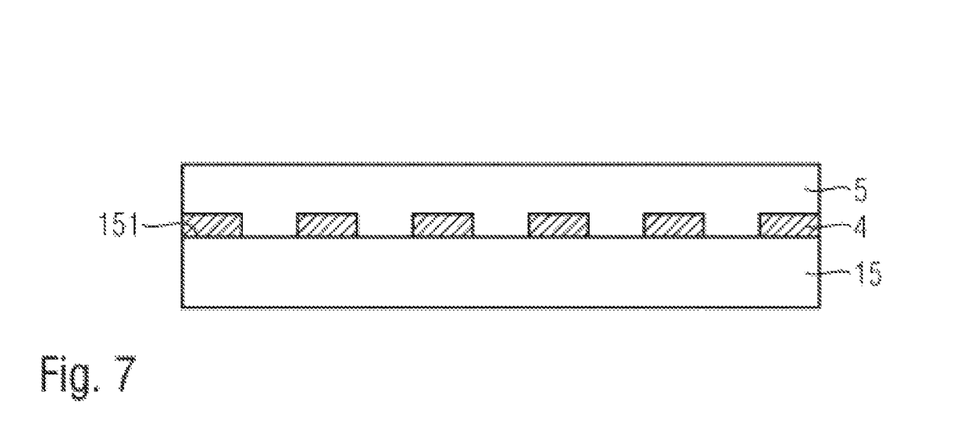
FIG. 7 shows the connection of the catalyst, the sorbent and the main support in a second embodiment.

FIG. 7 shows an alternative embodiment in which the sorbent 5 is deposited on the surface of the catalyst 4 e.g. from an aqueous solution or by vapor deposition. In this way, the sorbent 5 also fills the intermediate spaces between the individual partial areas of the catalyst 4 when the catalyst 4 only forms a partial coating of the main support 15.

In this case, the fuel/air mixture can diffuse through the sorbent 5 to the surface of the catalyst 4, such that the heat generated in the reaction directly influences the sorbent 5.

Figure 8:
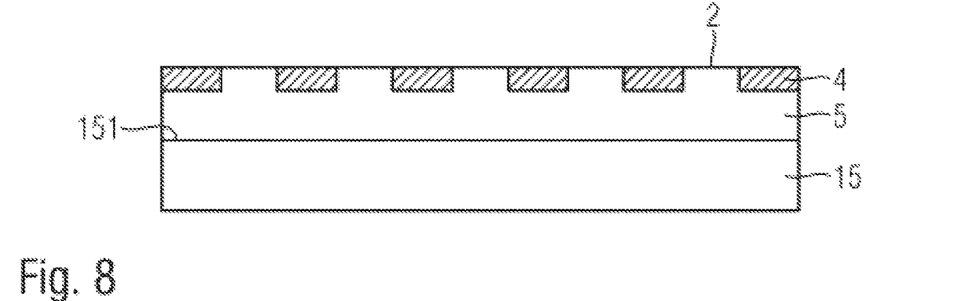
FIG. 8 shows the connection of the catalyst, the sorbent and the main support in a third embodiment.

FIG. 8 shows an embodiment in which the sorbent 5 is initially applied to the main support 15. This can be done e.g. by printing methods, by application with a doctor blade or by other coating methods known per se.

The catalyst 4 is deposited on the surface of the sorbent 5. In some embodiments of the invention, this can be carried out as a partial coating, such that partial areas 2 of the sorbent 5 continue to face the sorption duct 50. As a result, this leads to a good adsorption of the desired component of the gas stream in the sorbent 5. In addition, the surface of the catalyst 4 faces the fuel/air mixture, as a result of which the reaction has a higher efficiency and a rapid response is possible on account of the lacking diffusion.

Figure 9:
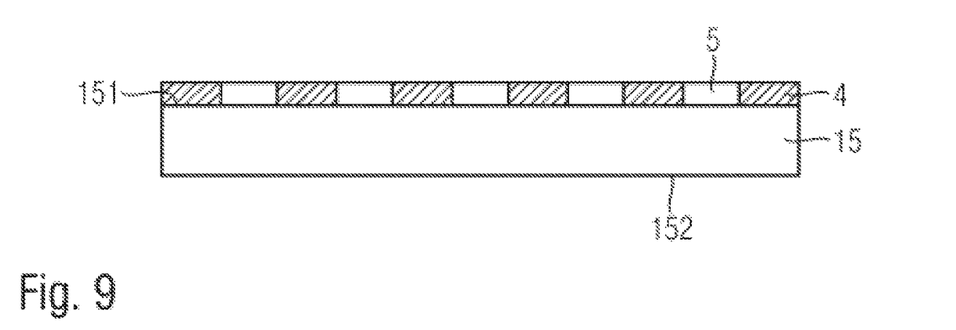
FIG. 9 shows the connection of the catalyst, the sorbent and the main support in a fourth embodiment.
Figure 10:
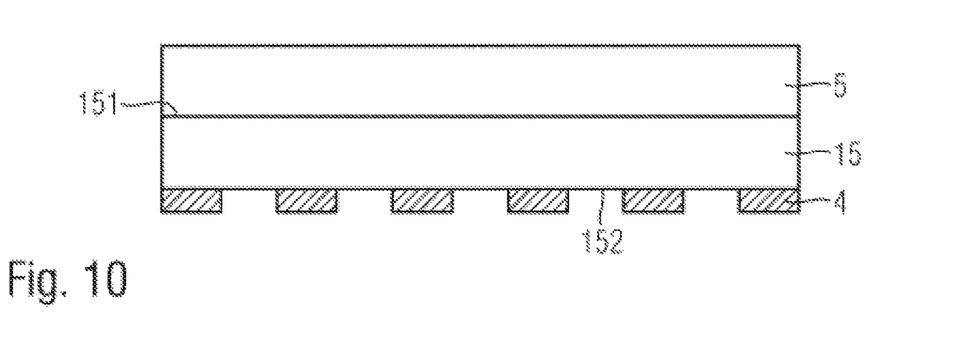
FIG. 10 shows the connection of the catalyst, the sorbent and the main support in a fifth embodiment.

FIG. 9 shows a further embodiment, in which both the sorbent 5 and the catalyst 4 each form a partial coating of the first side 151 of the main support 15. The smaller amount of the sorbent 5 in relation to FIG. 8 can be heated and cooled more rapidly, and therefore such a heat exchanger can allow a shorter cycle length.

FIG. 10 again shows the embodiment already known from FIG. 2 and FIG. 3, where the sorbent 5 and the catalyst 4 are arranged on opposite sides of the main support 15. In this case, the heat generated at the catalyst 4 is passed through the main support 15 to the sorbent 5.

Of course, the invention is not limited to the illustrated embodiments. Therefore, the above description should not be considered limiting but explanatory. The below claims should be understood such that a stated feature is present in at least one embodiment of the invention. This does not rule out the presence of further features. If the claims and the above description define "first" and "second" embodiments, this designation serves to distinguish between two similar embodiments without determining an order.

The invention claimed is:

1. A heat exchanger having at least one sorption duct, in which a sorbent is arranged and through which a fluid can flow, wherein the heat exchanger also contains at least one catalyst, by means of which a fuel can be reacted exothermically such that at least some of the resulting heat can be supplied to the sorbent.

2. The heat exchanger according to claim 1, comprising a main support having a first side and an opposite second side, wherein the at least one catalyst is arranged on the second side and the sorbent is arranged on the first side.

3. The heat exchanger according to claim 2, wherein one or both of the catalyst and the sorbent are applied to the main support by a process selected from one or more of the group consisting of screen printing, application with a doctor blade, sputtering, and wash-coating of the main support.

4. The heat exchanger according to claim 2, wherein the second side of the main support and a housing part define a fluid channel.

5. The heat exchanger according to claim 1, comprising at least one lambda probe or at least one temperature sensor.

6. The heat exchanger according to claim 1, wherein the sorbent comprises at least one of the group consisting of a metal organic framework, activated carbon, at least one zeolite, at least one silica gel, zeolite-like sorption materials, layer silicates, aluminophosphate, silica aluminophosphate, and a covalent organic framework.

7. The heat exchanger according to claim 1, wherein the catalyst comprises one or more of the group consisting of, platinum, palladium, rhodium, indium, copper, and oxides thereof.

8. A device for heating, humidifying, or dehumidifying comprising a heat exchanger according to claim 1.

9. A method for heating or conditioning a gas stream, comprising the steps of:
supplying a gas stream containing a plurality of different components into a sorption duct, which is part of a heat exchanger and in which a sorbent is arranged, such that at least one component of the gas stream is bonded in the sorbent; and
supplying and exothermically reacting at least one fuel under the influence of a catalyst, such that at least one component of the gas stream is expelled from the sorbent, wherein the catalyst is arranged in the interior or on an outer boundary wall of the heat exchanger.

10. The method according to claim 9, wherein the fuel is one or more of the group consisting of alcohol, methanol, $H_2$, methane, propane, and gasoline.

11. The method according to claim 9, wherein the sorbent comprises one or more of the group consisting of a metal organic framework, activated carbon, at least one zeolite, and at least one silica gel.

12. The method according to claim 9, wherein the catalyst comprises one or more of the group consisting of palladium, rhodium, indium, copper, and oxides thereof.

13. The method according to claim 9, wherein the at least one component comprises water or volatile organic compounds.

14. The method according to claim 9, comprising exothermically reacting the fuel to heat the sorbent to a temperature between about 40° C. to about 850° C.

15. The method according to claim 9, comprising introducing the fuel as an aerosol by means of a nozzle.

16. The method according to claim 9, comprising heating the sorbent or the catalyst with an electric heater or by the sorption of a component of the gas stream in the sorbent before the fuel is introduced.

17. The method according to claim 9, comprising the step of:
arranging said sorbent on a first side of a main support and arranging said catalyst on an opposite second side of the main support,
wherein said bonding of at least one component of the gas stream in the sorbent takes place on said first side and said exothermic catalytic reaction of the fuel takes place on the second side of the main support.

* * * * *